United States Patent
Cha et al.

(10) Patent No.: US 8,433,938 B2
(45) Date of Patent: Apr. 30, 2013

(54) BATTERY MODULE, COMPUTER SYSTEM HAVING THE SAME, AND CONTROL METHOD OF THE COMPUTER SYSTEM

(75) Inventors: Jae-deok Cha, Yongin-si (KR); Jong-tae Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 12/177,200

(22) Filed: Jul. 22, 2008

(65) Prior Publication Data

US 2009/0037754 A1 Feb. 5, 2009

(30) Foreign Application Priority Data

Jul. 30, 2007 (KR) ........................ 10-2007-0076336

(51) Int. Cl.
 *G06F 1/00* (2006.01)

(52) U.S. Cl.
 USPC ........... 713/322; 713/300; 713/320; 713/340; 320/127; 320/128; 320/134; 320/136; 320/137; 320/148; 320/149; 320/150; 320/152; 320/153; 320/157; 320/159; 320/162; 320/163; 320/164; 702/57; 702/63; 702/64

(58) Field of Classification Search ................. 713/300, 713/320, 322, 340; 320/127, 134, 135, 136, 320/128, 137, 148, 149, 150, 152, 153, 157, 320/159, 162, 163, 164; 702/57, 63, 64
See application file for complete search history.

(56) References Cited

U.S. PATENT DOCUMENTS

| | | | | |
|---|---|---|---|---|
| 5,534,765 A | * | 7/1996 | Kreisinger et al. | 320/106 |
| 5,563,496 A | * | 10/1996 | McClure | 320/128 |
| 6,229,352 B1 | * | 5/2001 | Chevallier et al. | 327/77 |
| 6,448,821 B1 | * | 9/2002 | Sakurai | 327/56 |
| 6,472,848 B2 | * | 10/2002 | Stryker et al. | 320/135 |
| 6,531,848 B1 | * | 3/2003 | Chitsazan et al. | 320/153 |
| 6,948,078 B2 | * | 9/2005 | Odaohhara | 713/300 |
| 7,017,061 B2 | * | 3/2006 | Lippert et al. | 713/324 |
| 7,057,372 B2 | * | 6/2006 | Chen et al. | 320/106 |
| 7,203,856 B2 | * | 4/2007 | Yeh | 713/322 |
| 7,443,176 B2 | * | 10/2008 | McClure et al. | 324/685 |
| 7,514,904 B2 | * | 4/2009 | Marchand et al. | 320/150 |
| 7,533,284 B2 | * | 5/2009 | Chen | 713/340 |
| 7,552,353 B2 | * | 6/2009 | Ho et al. | 713/600 |
| 7,570,021 B2 | * | 8/2009 | Togashi et al. | 320/130 |
| 7,624,292 B2 | * | 11/2009 | Nishida | 713/340 |
| 7,629,765 B2 | * | 12/2009 | Chen et al. | 320/106 |
| 7,840,840 B2 | * | 11/2010 | Takahashi et al. | 714/14 |
| 8,001,400 B2 | * | 8/2011 | Fadell | 713/320 |
| 8,321,619 B2 | * | 11/2012 | Kular et al. | 710/313 |
| 2002/0079866 A1 | * | 6/2002 | Odaohhara | 320/150 |

(Continued)

FOREIGN PATENT DOCUMENTS

| | | |
|---|---|---|
| EP | 0 496 536 A2 | 7/1992 |
| EP | 1 225 504 A1 | 7/2002 |
| EP | 1 471 593 A1 | 10/2004 |
| KR | 2003-82190 | 10/2003 |

*Primary Examiner* — Jaweed A Abbaszadeh (74) *Attorney, Agent, or Firm* — Jefferson IP Law, LLP (57) ABSTRACT

A computer system includes a device which operates depending on a clock frequency; a battery unit which comprises a plurality of battery cells and supplies power to the device; a temperature sensor which senses temperature of the battery cells; and a controller which decreases the clock frequency if the sensed temperature is beyond a first preset critical point.

18 Claims, 9 Drawing Sheets

U.S. PATENT DOCUMENTS

| | | |
|---|---|---|
| 2003/0027036 A1* | 2/2003 | Emori et al. .................... 429/61 |
| 2003/0204762 A1* | 10/2003 | Lee et al. ...................... 713/322 |
| 2004/0070371 A1* | 4/2004 | Chern et al. .................. 320/136 |
| 2004/0168095 A1 | 8/2004 | Yeh |
| 2004/0236969 A1 | 11/2004 | Lippert et al. |
| 2004/0255174 A1 | 12/2004 | Chen et al. |
| 2005/0076258 A1* | 4/2005 | Cheung et al. ................ 713/322 |
| 2006/0117194 A1* | 6/2006 | Nishida ......................... 713/300 |
| 2008/0150488 A1* | 6/2008 | Lu et al. ........................ 320/134 |
| 2008/0158220 A1* | 7/2008 | Huang et al. .................. 345/213 |

* cited by examiner

BATTERY MODULE, COMPUTER SYSTEM HAVING THE SAME, AND CONTROL METHOD OF THE COMPUTER SYSTEM

CROSS-REFERENCE TO RELATED APPLICATIONS

This application claims priority from Korean Patent Application No. 2007-76336, filed on Jul. 30, 2007 in the Korean Intellectual Property Office, the disclosure of which is incorporated herein by reference.

BACKGROUND OF THE INVENTION

1. Field of the Invention

Aspects of the present invention relate to a battery module, a computer system having the same, and a control method of the computer system, and more particularly, to a battery module capable of performing a throttling function, a computer system having the same, and a control method of the computer system.

2. Description of the Related Art

Among computer systems, a notebook computer, a personal digital assistant, etc., are being widely used because they are portable and usable while being moved. Such an electronic device may either use an external power source supplied through an AC/DC adapter or a secondary battery charged by the adapter.

In a technical field related to the battery of the portable computer, there is much research dedicated to producing an extended battery life (EBL). For example, a narrow voltage direct current (NVDC) has been proposed to extend the life of the battery.

Meanwhile, a maximum consumable power discharged from the battery may vary according to the number and characteristics of battery cells provided therein. If power discharged from the battery is more than the maximum consumable power, an internal temperature of the battery rapidly increases. For example, when operations that require substantial power are performed, the temperature of the battery increases quickly. Such demanding operations include reproducing a recordable medium, operating a computer game, and the like. The maximum consumable power refers to the maximum value within a range in which the battery can stably supply current to a load.

As the temperature of the battery increases and reaches a critical point, a logical fuse, a positive thermal coefficient (PTC) element, etc., which are susceptive to temperatures are cut off one after another, so that a system using the battery suddenly stops. In such case, the system may fail and unsaved data may be lost.

SUMMARY OF THE INVENTION

Accordingly, it is an aspect of the present invention to provide a battery module capable of stably supplying power, a computer system having the same, and a control method of the computer system.

Another aspect of the present invention is to provide a computer system and a control method thereof, which are capable of preventing a system error and a data loss due to sudden power-off.

Aspects of the present invention provide a computer system including a device which operates according to a predetermined clock frequency; a battery unit, which comprises a plurality of battery cells, to supply power to the device; a temperature sensor to sense a temperature of the battery cells; and a controller to control the clock frequency of the device according to at least the sensed temperature, wherein the controller decreases the clock frequency if the sensed temperature is beyond a first preset critical point.

According to an aspect of the invention, the computer system may include a current sensor which senses current output from the battery unit, wherein the controller decreases the clock frequency if the sensed current is beyond a second preset critical point.

According to an aspect of the invention, the controller may include a first comparator which compares a voltage level corresponding to the sensed temperature with a voltage level corresponding to the first critical point; a second comparator which may compare a voltage level corresponding to the sensed current with a voltage level corresponding to the second critical point; and a logical sum operator which may include a first input terminal connected to an output terminal of the first comparator and a second input terminal connected to an output terminal of the second comparator, and outputs a clock control signal to the device.

According to an aspect of the invention, the same reference voltage level may be input to the first comparator and the second comparator.

According to an aspect of the invention, the controller may further include a scaling factor unit that scales at least one of the voltage level corresponding to the sensed temperature and the voltage level corresponding to the sensed current as a dimension of the reference voltage level.

According to an aspect of the invention, the device may include a thermal throttling circuit to control the clock frequency according to temperature, and the thermal throttling circuit is controlled according to a clock control signal applied to the thermal throttling circuit by the controller.

According to an aspect of the invention, the thermal throttling circuit may include a divider to divide the clock frequency.

Aspects of the present invention provide a computer system including a device which operates depending on a predetermined clock frequency; a battery unit which supplies power to the device; and a controller which controls the clock frequency if at least one of current output and temperature of the battery unit is beyond a preset critical range.

According to an aspect of the invention, the device may include a thermal throttling circuit to adjust the clock frequency according to temperature, and the controller enables the thermal throttling circuit.

Aspects of the present invention provide a battery module used in a computer system having a system part that operates depending on a predetermined clock frequency, the battery module includes a battery unit which includes a plurality of battery cells and supplies power to the system part; a temperature sensor which senses temperature of the battery cells; a current sensor which senses current output from the battery unit; a scaling factor unit which scales at least one of a voltage level corresponding to the sensed temperature and a voltage level corresponding to the sensed current as a dimension of a reference voltage level; a first comparator which compares a voltage level corresponding to the sensed temperature with the reference voltage level; a second comparator which compares a voltage level corresponding to the sensed current with the reference voltage level; and a logical sum operator which includes a first input terminal connected to an output terminal of the first comparator and a second input terminal connected to an output terminal of the second comparator, and outputs a clock control signal to the system part.

Aspects of the present invention provide a power control method of a computer system that includes a battery unit and a device operating depending on a predetermined clock frequency, the power control method including sensing temperature of the battery unit; and decreasing the clock frequency if the sensed temperature is beyond a first preset critical point.

According to an aspect of the invention, the power control method may further include sensing current output from the battery unit; and decreasing the clock frequency if the sensed current is beyond a second preset critical point.

According to an aspect of the invention, the device may include a thermal throttling circuit to control the clock frequency according to temperature, and the decreasing the clock frequency includes enabling the thermal throttling circuit; and dividing the clock frequency.

Additional aspects and/or advantages of the invention will be set forth in part in the description which follows and, in part, will be obvious from the description, or may be learned by practice of the invention.

Aspects of the present invention provide a power control method of a computer system that comprises a battery unit and a device operating according to a clock frequency, the power control method comprising: sensing a temperature of the battery unit; sensing a current output from the battery unit; and decreasing the clock frequency if the sensed temperature is beyond a first preset critical point or if the sensed current is beyond a second preset critical point

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

Figure 1:
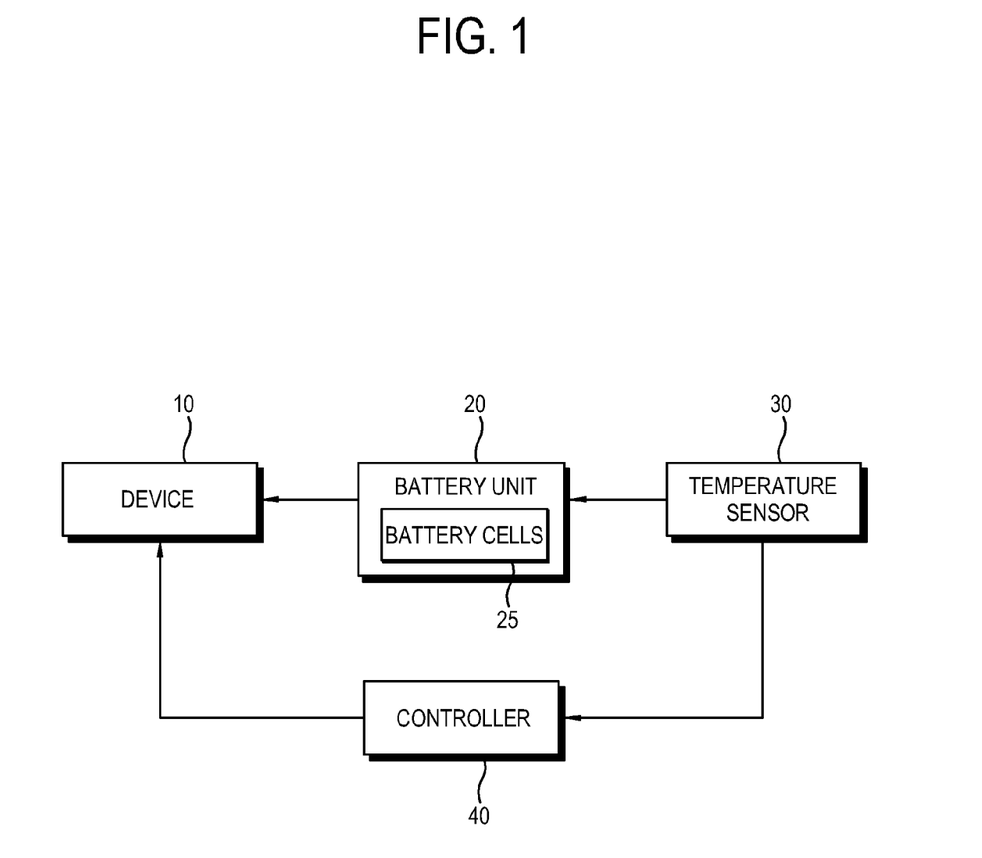
FIG. 1 is a control block diagram of a computer system according to a first exemplary embodiment of the present invention.

FIG. 1 is a control block diagram of a computer system according to an exemplary embodiment of the present invention. As shown therein, a computer system includes a device 10; a battery unit 20 including battery cells 25; a temperature sensor 30; and a controller 40 to control the device 10, the battery unit 20, and the temperature sensor 30.

The device 10 operates depending on a predetermined clock frequency and causes the computer system to perform various operations. In this embodiment, the device 10 may include a central processing unit (CPU), a graphic chip, or the like, which includes an independent controller and operate and process data. Here, the device 10 operates and processes data depending on a core clock or a similar clock. The speed of operating and processing data increases as the frequency of the core clock increases. Further, an interior temperature of the device 10 increases as the speed of operating and processing data increases. To control the interior temperature, the device 10 can independently control the clock frequency. In other words, the device 10 according to aspects of the present embodiment has a throttling function that changes the clock frequency to control the temperature and power.

The battery unit 20 includes the battery cells 25 and supplies the device with power. A rechargeable auxiliary power source, such as the battery unit 20, is necessary to a portable computer, such as a notebook computer, a personal digital assistant (PDA), etc. The battery cells 25 are connected in series or parallel and output power at various voltage levels. The more battery cells 25 the battery unit 20 includes, the greater the maximum consumable power that is output. The maximum consumable power refers to the maximum value within a range in which the battery can stably supply current to a load. As the speed of operating and processing data in the device 10 increases, the power consumption increases and a power supply which supplies the device 10 with the power, particularly, the battery unit 20 used as the auxiliary power source, increases in temperature. Further, if the battery unit 20 discharges power at a level greater than the maximum consumable power, the interior temperature of the battery unit 20 increases so rapidly that internal elements of the computer system, such as a logical fuse, a positive thermal coefficient (PTC) element, etc., are cut off one after another. Accordingly, it is beneficial to make the battery unit 20 output the power stably.

The temperature sensor 30 senses the temperature of the battery unit 20, i.e., the battery cells 25, and outputs the sensed temperature to the controller 40. The temperature sensor 30 may output to the controller 40 a voltage level corresponding to the sensed temperature. Alternatively, the temperature sensor 30 may convert analog information about the sensed temperature into digital data and output the digital data corresponding to the sensed temperature to the controller 40.

If the temperature of the battery cells 25 is higher than a predetermined critical point, the controller 40 decreases the clock frequency of the device 10. Here, the controller 40 may directly decrease the clock frequency of the device 10 or enable the throttling function of the device 10. The critical point is set to be lower than a temperature managed in the battery unit 20. For example, a smarter battery, which may be used as the battery unit 20, stops supplying power in order to protect itself when the interior temperature thereof reaches a certain temperature (about 80° C.). In such case, the predetermined critical point may be set in a range from 45° C. to 60° C. When the sensed temperature is higher than the predetermined critical point, the controller 40 may decrease the clock frequency of the device 10 so as to stably supply the power and preliminarily protect the computer system.

As the clock frequency becomes lower, not only the speed of operating and processing the data decreases but also the power needed for operating and processing the data decreases. Consequently, the amount of current supplied from the battery cells 25 decreases, and the temperature of the battery cells 25 decreases. As the temperature of the battery cells 25 decreases, the computer system is prevented from being suddenly cut off. Further, data loss due to the sudden cut-off is prevented.

Figure 2:
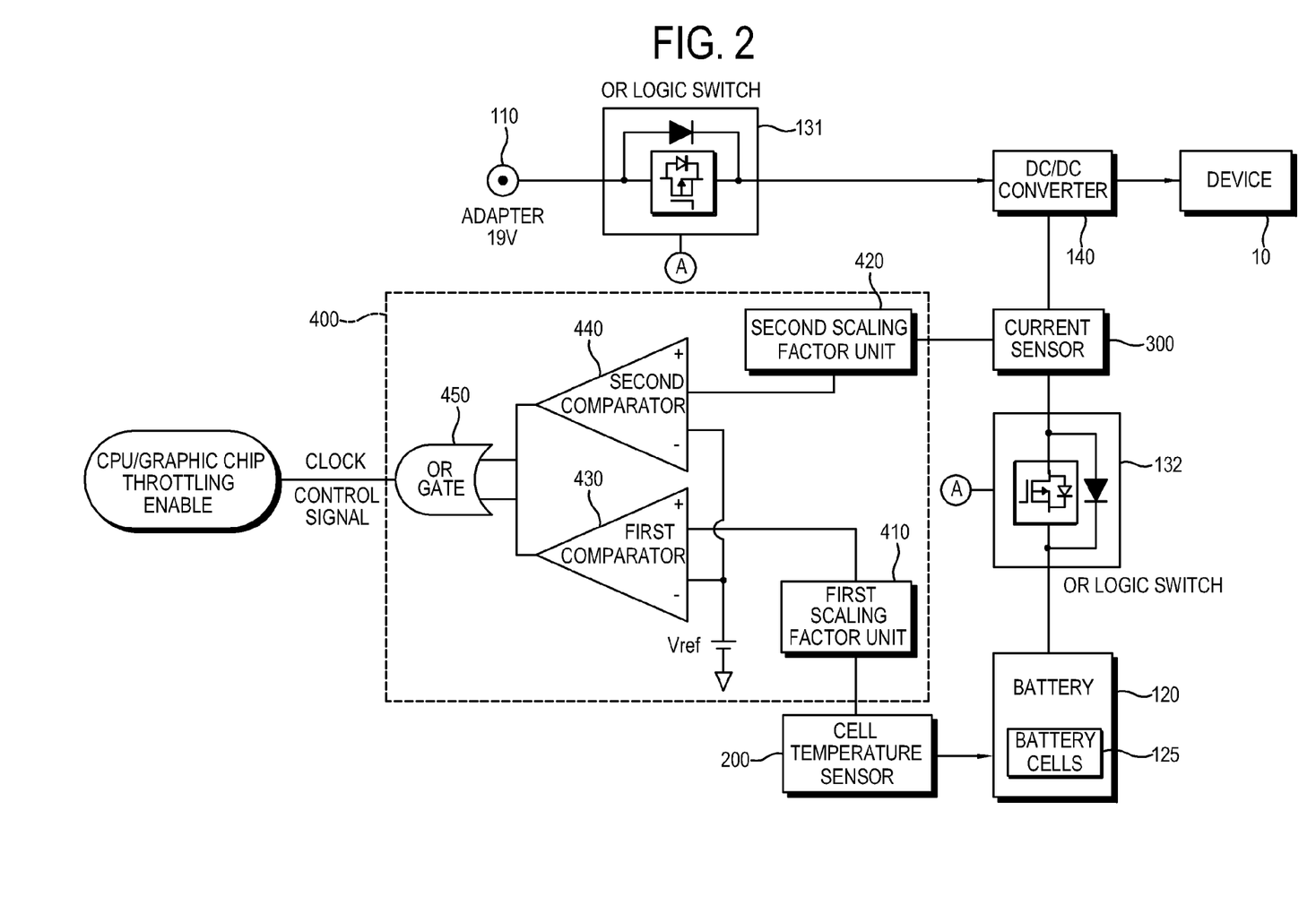
FIG. 2 is a control block diagram of a computer system according to a second exemplary embodiment of the present invention.

FIG. 2 is a control block diagram of a computer system according to an exemplary embodiment of the present invention. As shown therein, the computer system in this embodiment includes an adapter 110, a battery 120, a first switch 131, a second switch 132, a DC/DC converter 140, a cell temperature sensor 200, a current sensor 300, and a controller 400 to control the foregoing and/or other elements. The controller 400 includes a first scaling factor unit 410, a second scaling factor unit 420, a first comparator 430, a second comparator 440, and an OR gate 450, and operates similar to the controller in the above-described embodiment associated with FIG. 1.

The adapter 110 is used as a main power source to supply DC power converted from AC power to the device 10. The AC power input through the adapter 110 is converted into the DC power by the DC/DC converter 140, and the DC power is supplied to the system such as the device 10 or the like. Further, the adapter 110 supplies the battery 120 with power for charging the battery 120 via a predetermined path (not shown).

The battery 120 includes a plurality of battery cells 125 and supplies the device 10 with auxiliary power. If the amount of current output from the battery 120 increases, the temperature of the battery cells 125 increases. The temperature of the battery cells 125 may increase by a malfunction or the like in addition to or instead of to the temperature increase in proportion to the increased current amount.

The first switch 131 and the second switch 132 are provided as OR logic switches to supply the device 10 with the power from either of the adapter 110 or the battery 120. If the device 10 is supplied with the power from the adapter 110, the power from the battery 120 is cut off. However, if there is no power from the adapter 110, the battery 120 supplies the power to the device 10. As shown in FIG. 2, the first switch 131 and the second switch 132 are provided as a field effect transistor (FET); however, the first switch 131 and the second switch 132 are not limited thereto. Additionally, the computer system may include a switch controller (not shown) to sense whether the power is supplied from the adapter 110 and transmits a control signal A to each of the first switch 131 and second switch 132.

In this embodiment, the computer system includes a cell temperature sensor 200 corresponding to the temperature sensor 30 of the above embodiment of FIG. 1.

The current sensor 300 senses the amount of current output from the battery 120. The current sensor 300 according to this embodiment outputs a voltage level corresponding to the sensed current, but not limited thereto. Alternatively, the current sensor 300 may output a digital signal corresponding to the sensed current.

The first scaling factor unit 410 scales the voltage level corresponding to the temperature sensed by the cell temperature sensor 200 as a dimension of a reference voltage level Vref, and the second scaling factor unit 420 scales the voltage level corresponding to the current sensed by the current sensor 300 as a dimension of the reference voltage level Vref. The first scaling factor unit 410 and the second scaling factor unit 420 may be provided as resistors. The same reference voltage level Vref is input to the first comparator 430 and the second comparator 440 as a reference. Thus, the voltage level input to each comparator 430 and 440 is scaled as a dimension of the reference voltage level Vref.

In another embodiment, the cell temperature sensor 200 and the current sensor 300 may output information, such as temperature and current, instead of the voltage level. To this end, the first scaling factor unit 410 and second scaling factor unit 420 may include a lookup table or the like to convert the temperature and the current into the dimension of the reference voltage. Here, the lookup table includes information about the voltage level corresponding to the input temperature and the input current, and each of the first scaling factor unit 410 and second scaling factor unit 420 outputs a scaled value corresponding to the temperature and the current.

The first comparator 430 compares a voltage level corresponding to temperature input through a non-inversion terminal with the reference voltage level input through an inversion terminal and outputs a predetermined signal through an output terminal if the voltage level corresponding to the sensed temperature is higher than the reference voltage level Vref. The second comparator 440 compares a voltage level corresponding to current input through the non-inversion terminal with the reference voltage level input through the inversion terminal and outputs a predetermined signal through an output terminal if the voltage level corresponding to the sensed current is higher than the reference voltage level Vref.

The OR gate 450 is an element that implements a logical sum, of which a first input terminal connected to the output terminal of the first comparator 430 and a second input terminal connected to the output terminal of the second comparator 440. The OR gate 450 outputs a control signal if it receives the signal from either of the first comparator 430 or second comparator 440. The control signal output from the OR gate 450 is used as a clock control signal to enable the throttling function to lower the clock frequency of the device 10, such as the CPU or the graphic chip. In other words, the controller 400 outputs the clock control signal to enable the throttling function of the CPU or the graphic chip if either of the sensed current or the sensed temperature is beyond the critical point.

Figure 3:
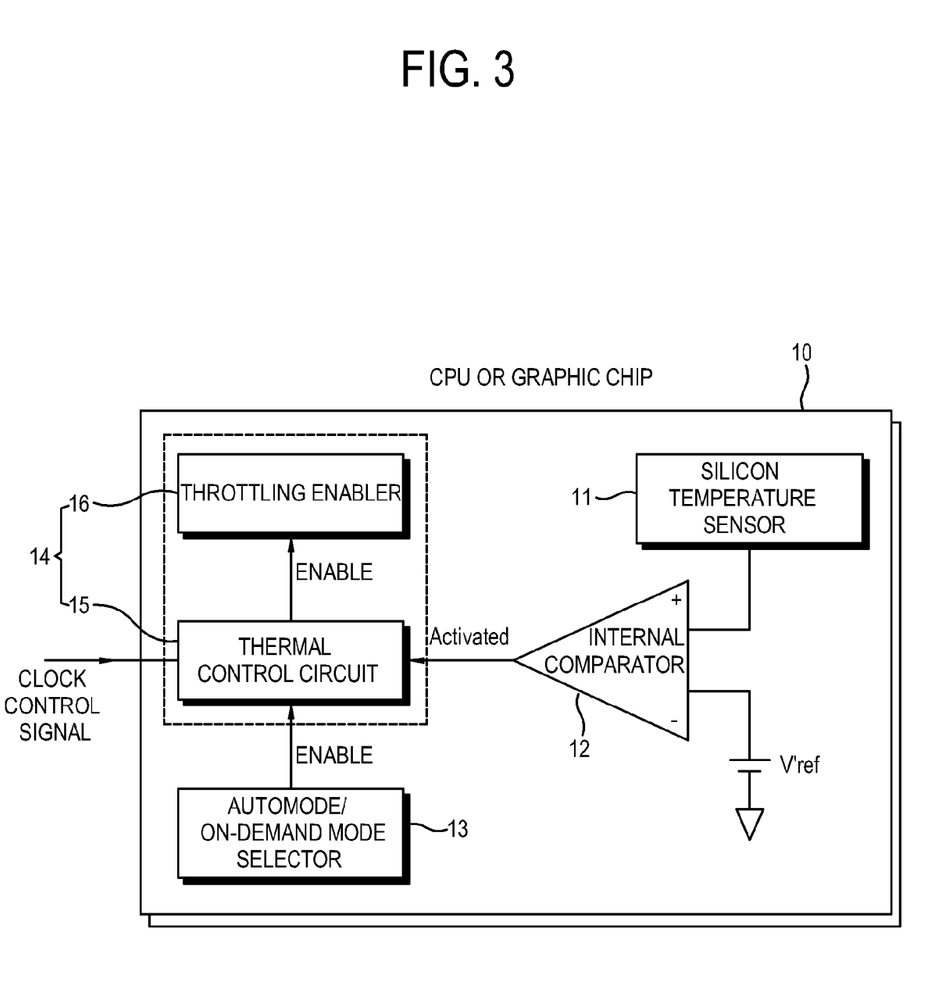
FIG. 3 is a control block diagram of a device according to the second exemplary embodiment of the present invention.

FIG. 3 is a control block diagram of the device according to an exemplary embodiment of the present invention, which explains a throttling function of the device 10. As shown therein, if it is sensed that the interior temperature of the device 10, such as the CPU or the graphic chip, reaches a certain critical point, a throttling operation to decrease the clock frequency is performed. To this end, the device 10 includes a silicon temperature sensor 11, an internal comparator 12, an auto mode/on-demand mode selector 13, and a thermal throttling circuit 14. Here, the thermal throttling circuit 14 includes a thermal control circuit 15 and a throttling enabler 16.

The internal comparator 12 compares the temperature input from the silicon temperature sensor 11 with an internal reference value Vref', and activates the thermal control circuit 15 when the sensed temperature is higher than the reference value Vref'.

The auto mode/on-demand mode selector 13 operates depending on a basic input/output system (BIOS) to thereby switch operation of the thermal control circuit 15 between an auto mode and an on-demand mode. Here, the thermal control circuit 15 operates when the auto mode/on-demand mode selector 13 outputs an enable signal. The enable signal output from the auto mode/on-demand mode selector 13 is a precondition for operating the thermal throttling circuit 14.

The thermal control circuit 15 outputs an enable signal to the throttling enabler 16 if the clock control signal is output from the OR gate 45 (refer to FIG. 2), and controls the throttling enabler 16 to lower the clock frequency. Here, the throttling enabler 16 changes the clock frequency and may be realized as a time-sharing divider that divides the clock frequency.

Figure 4:
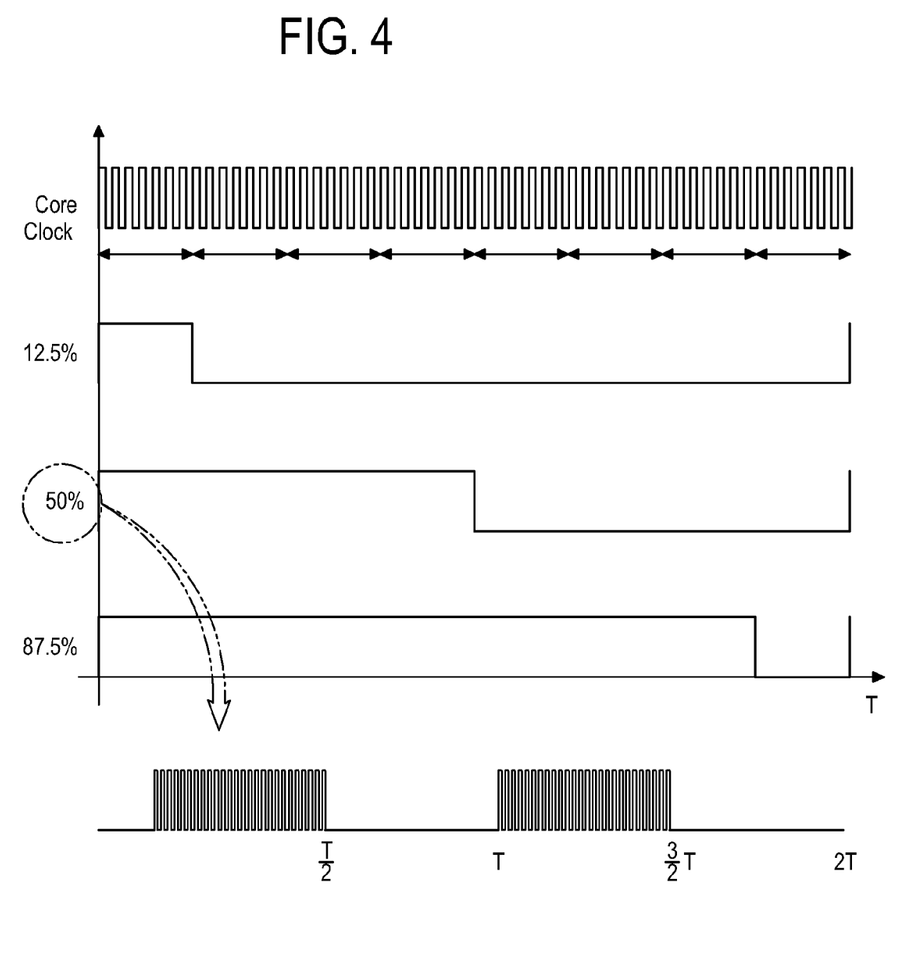
FIG. 4 illustrates a decrease in a clock frequency according to the second exemplary embodiment of the present invention.

FIG. 4 shows waveforms to explain a decrease in a clock frequency according to the exemplary embodiment of the present invention. In FIG. 4, (a) illustrates the core clock frequency of the CPU or the graphic chip, which typically ranges about from 1 GHz to 2 GHz; and (b) through (d) indicate that various divisions are applied to the core clock frequency. Specifically, (b), (c), and (d) indicate that divisions of ⅛, ½ and ⅞ are applied to the clock frequency having a certain period T, respectively. In the auto mode, the division of ½ is applied to the clock frequency (refer to (c)). (e) denotes the core clock frequency for two periods, which is divided like (c) and in which waveforms of (a) and (c) are synthesized. The clock frequency is enabled and output for a half of the certain period T, but disabled and not output for the other half. While the clock frequency is disabled, the CPU or the graphic chip temporarily becomes idle and thus power consumption decreases. Accordingly, the temperature of the battery 120 is decreased.

Figure 5A:
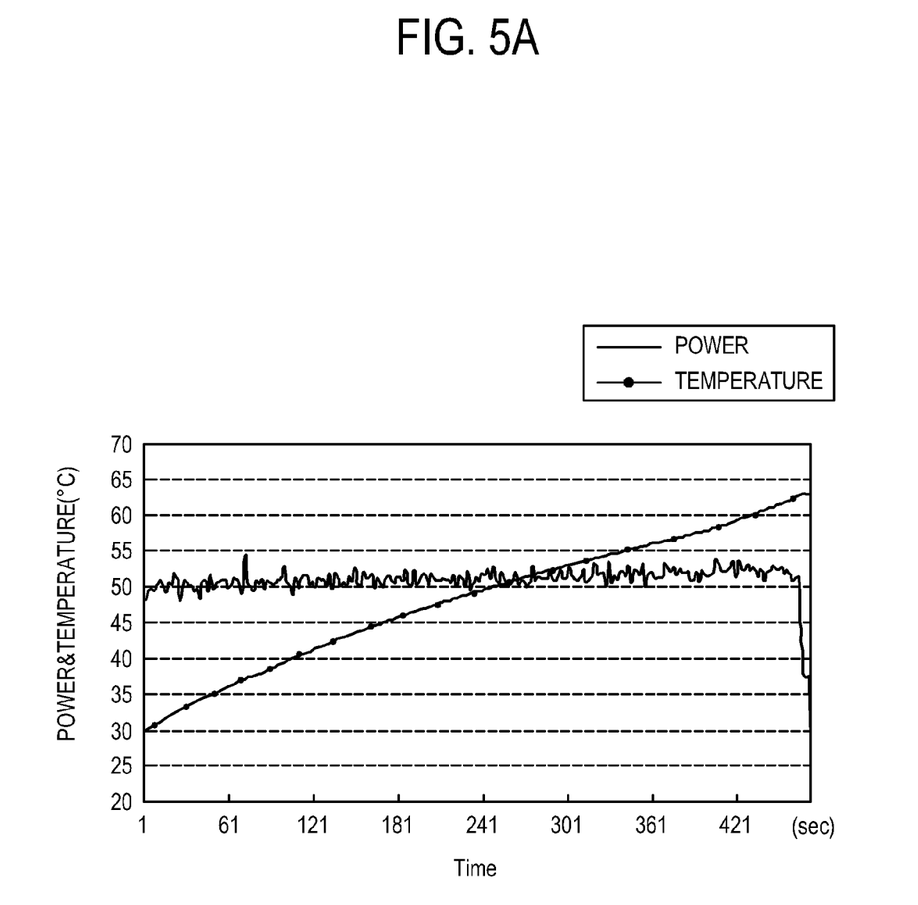
FIGS. 5A through 5D are graphs illustrate a throttling effect according to the second exemplary embodiment of the present invention.

FIGS. 5A through 5D are graphs showing a throttling effect according to an exemplary embodiment of the present invention. FIG. 5A shows a power consumption in the battery 120 and a temperature change of the battery cell 125 as time passes in the case that the throttling function is disabled. If a power of about 50 W, on average, 53.4 W is continuously consumed from the battery cells 125, the temperature of the battery cells 125 increases as time progresses.

Figure 5B:
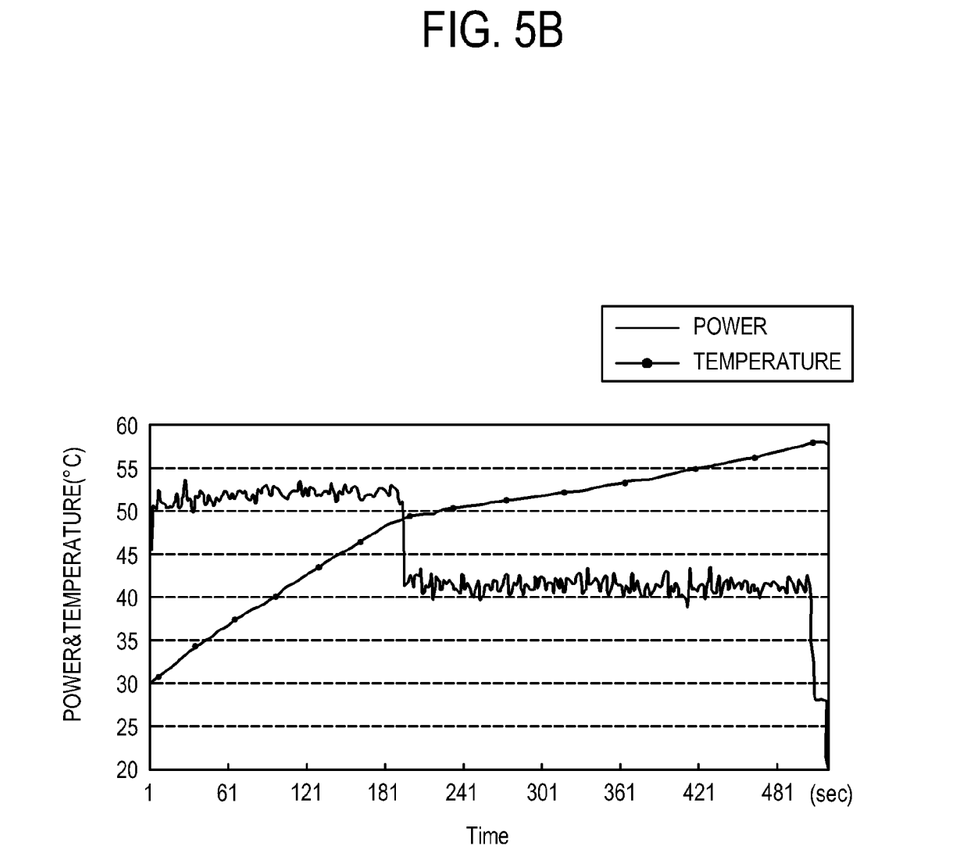
Figure 5C:
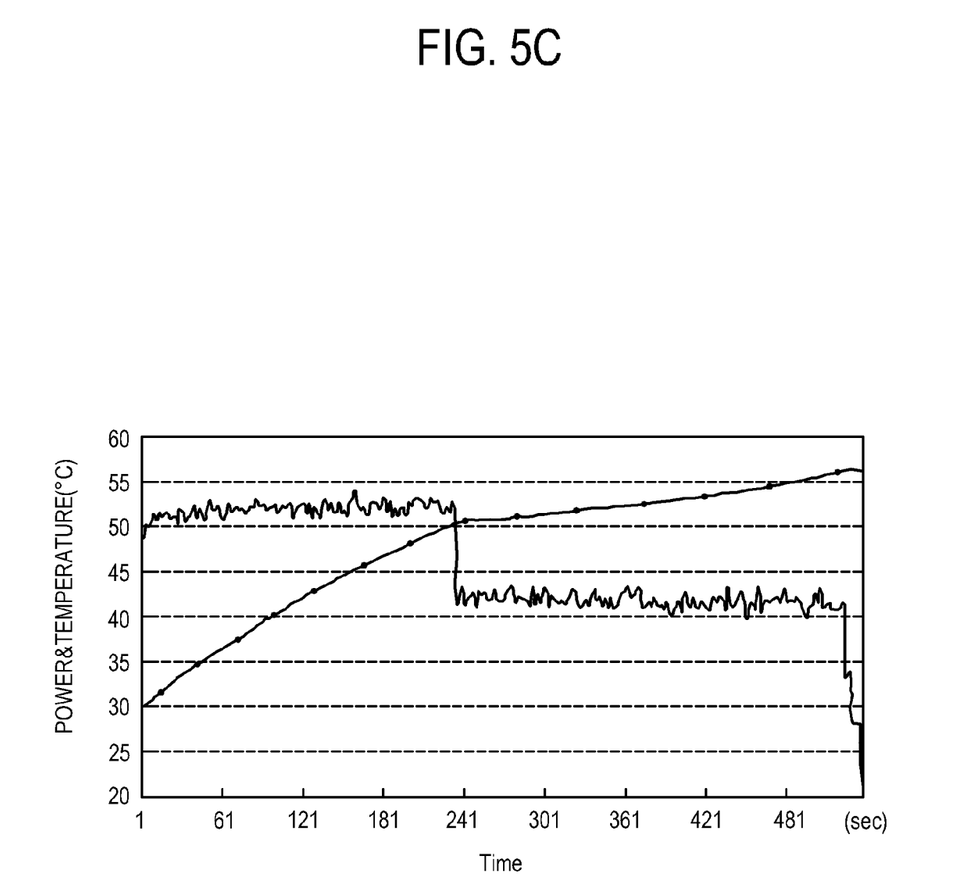

FIG. 5B is a graph showing the power consumption and the temperature change in the battery 120 in the case that the throttling function is enabled when the battery cells 125 are maintained at a temperature of about 45° C. or more for approximately four minutes, and FIG. 5C is a graph showing the power consumption and the temperature change in the battery 120 in the case that the throttling function is enabled when the battery cells 125 are maintained at a temperature of about 50° C. or more for approximately four minutes. As shown in FIGS. 5B and 5C, if the throttling function is enabled, a temperature increase rate of the battery cells 125 is lowered, and the power consumption is rapidly decreased. When the throttling function was enabled at the temperature of about 45° C., an average power consumption was about 44.86 W. When the throttling function was enabled at the temperature of about 50° C., an average power consumption was about 45.81 W. The power consumption based on the enabled throttling function is less than that based on the disabled throttling function, so that the battery 120 can stably supply power and increase in lifespan.

The throttling function is disabled if the battery cells 125 are maintained for a predetermined time at a temperature that is lower than the temperature causing the throttling function to be enabled. For example, in the case shown in FIG. 5B, the clock frequency may increase if the battery cells 125 are maintained for about two minutes or more under the temperature of 40° C. and below; and in the case shown in FIG. 5C, the clock frequency may increase if the battery cells 125 are maintained for about two minutes or more under the temperature of 45° C. and below.

Figure 5D:
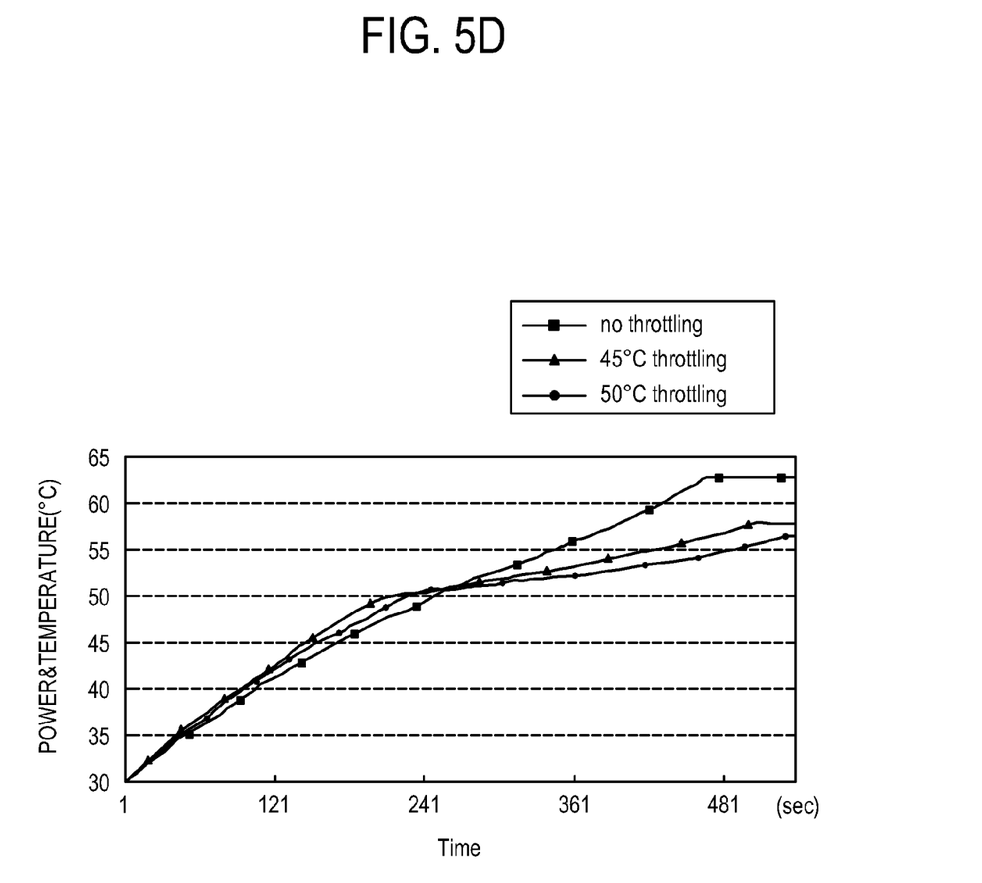

With reference to FIG. 5D, the temperatures of the battery cells 125 for each of the above-described throttling situations are compared. As can be seen in FIG. 5D, when the throttling function is disabled, the temperature of the battery cells 125 continues to rise. When the throttling function is enabled at the temperatures of 45° C. and 50° C., it can be seen that the temperatures of the battery cells 125 increases less than when the throttling function is disabled.

Figure 6:
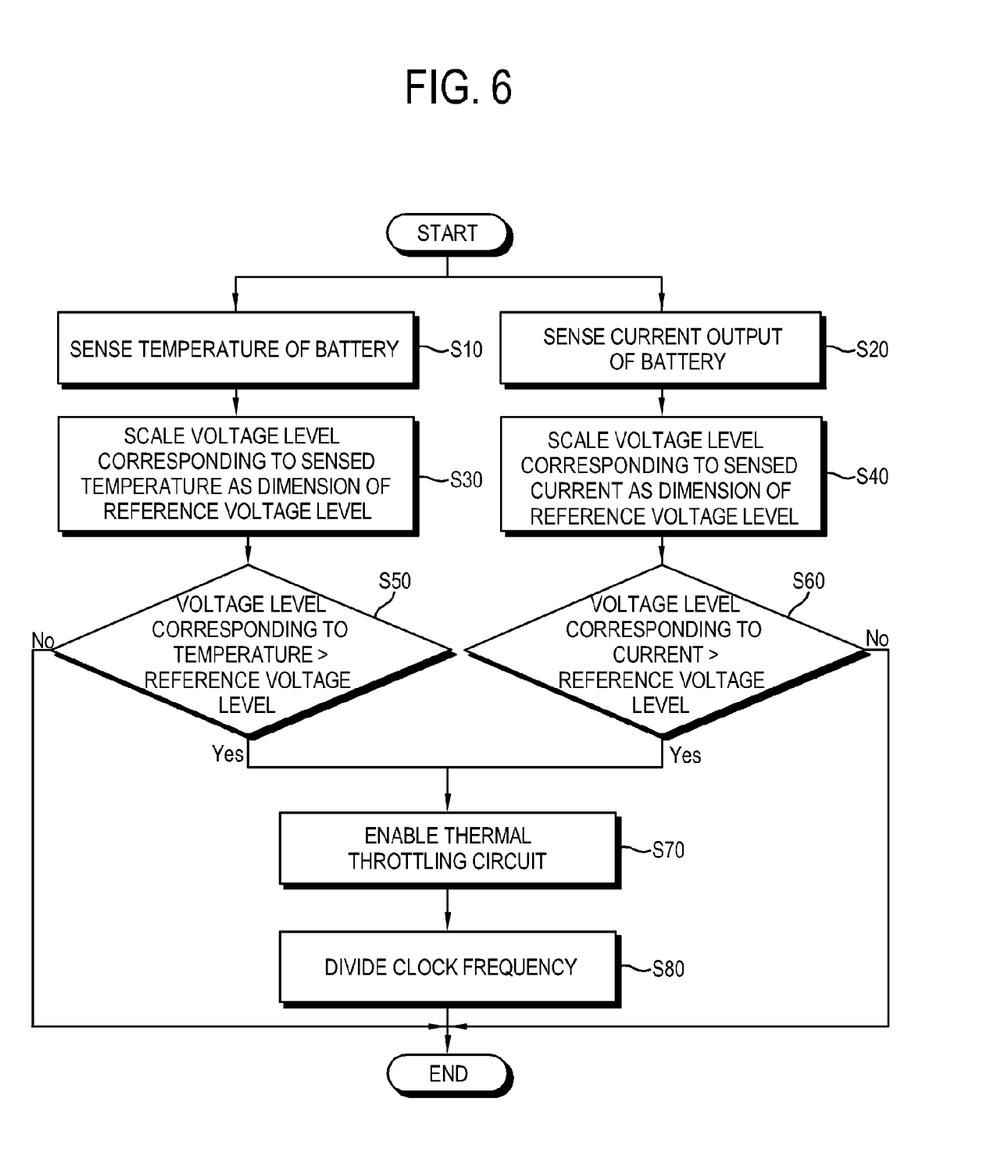
FIG. 6 is a control flowchart of a control method of the computer system according to the second exemplary embodiment of the present invention.

FIG. 6 is a control flowchart that explains a control method of the computer system according to the second exemplary embodiment of the present invention. As shown in FIG. 6, the controller 400 operates as follows: First, the cell temperature sensor 200 senses the temperature of the battery cells 125 at operation S10, and the current sensor 300 senses the current output from the battery 120 at operation S20.

At operations S30 and S40, the voltage level corresponding to the sensed temperature and the voltage level corresponding to the sensed current are scaled as the dimension of the reference voltage level by the first scaling factor unit 410 and the second scaling factor unit 420, respectively. At operations S50 and S60, the first comparator 430 and the second comparator 440 determine whether the scaled voltage level corresponding to the temperature and the scaled voltage level corresponding to the current are beyond the reference voltage level, respectively.

In a determination result, if either of the voltage level corresponding to the temperature or the voltage level corresponding to the current is beyond the reference voltage level, the controller 400 enables the thermal throttling circuit 14 provided in the device 10 at operation S70.

The thermal control circuit 15 of the thermal throttling circuit 14 receives the clock control signal corresponding to the enable signal, and controls the throttling enabler 16 to divide the clock frequency at operation S80.

The temperature control circuit 15 may control the throttling enabler 16 according to a logical sum between an activation signal from the internal comparator 12 and the clock control signal from the controller 400, but the temperature control circuit 15 is not limited thereto as such control is not necessary.

Alternatively, the reference voltage levels Vref input to the first comparator 430 and the second comparator 440 may be different from each other. As such, the reference voltage level Vref to be input to the first comparator 430 is set as a level corresponding to a critical temperature at which consumable power output from the battery 120 is not higher than the maximum consumable power. Likewise, the reference voltage level Vref to be input to the second comparator 440 is set as a level corresponding to a critical current at which consumable power output from the battery 120 is not higher than the maximum consumable power. Accordingly, at least one of the first scaling factor unit 410 and the second scaling factor unit 420 may be not needed.

Further, the adapter 110, the switches 131 and 132, and the DC/DC converter 140 may be separated from the computer system and may be provided in a battery module. In such case, the clock control signal output from the controller 400 may be transmitted to the device 10 via a general system bus. Alternatively, other elements except the battery 120 may be provided in the computer system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A computer system, comprising:
a device which operates according to a clock frequency;
a battery unit, which comprises a plurality of battery cells, to supply power to the device;
a temperature sensor to sense a temperature of the battery cells;
a controller to control the clock frequency of the device according to at least the sensed temperature; and
a current sensor to sense current output from the battery unit, wherein the controller decreases the clock frequency if the sensed temperature is beyond a first preset critical point, wherein the controller decreases the clock frequency if the sensed current is beyond a second preset critical point, and wherein the controller comprises:
  a first comparator to compare a voltage level corresponding to the sensed temperature with a voltage level corresponding to the first preset critical point;
  a second comparator to compare a voltage level corresponding to the sensed current with a voltage level corresponding to the second preset critical point; and
  a logical sum operator which comprises a first input terminal connected to an output terminal of the first comparator and a second input terminal connected to an output terminal of the second comparator, and outputs a clock control signal to the device.

2. The computer system of claim 1, wherein a same reference voltage level is input to the first comparator and the second comparator.

3. The computer system of claim 2, wherein the controller further comprises a scaling factor unit that scales at least one of the voltage level corresponding to the sensed temperature and the voltage level corresponding to the sensed current as a dimension of the reference voltage level.

4. The computer system of claim 1, wherein the device comprises a thermal throttling circuit to control the clock frequency according to temperature, and the thermal throttling circuit is controlled according to a clock control signal applied to the thermal throttling circuit by the controller.

5. The computer system of claim 4, wherein the thermal throttling circuit comprises a divider to divide the clock frequency.

6. The computer system of claim 4, wherein the thermal throttling circuit comprises;
  a throttling enabler to enable a throttling function; and
  a thermal control circuit to output an enable signal to the throttling enabler according to the clock control signal from the controller.

7. The computer system of claim 1, wherein the logical sum operator outputs the clock control signal to the device according to at least one of a first comparison signal from the first comparator and a second comparison signal from the second comparator.

8. The computer system of claim 7, wherein the first comparator outputs the first comparison signal if the voltage level corresponding to the sensed temperature is greater than or equal to the voltage level corresponding to the first critical point, and the second comparator outputs the second comparison signal if the voltage level corresponding to the sensed current is greater than or equal to the voltage level corresponding to the second critical point.

9. The computer system of claim 1, wherein the first preset critical point corresponds to a critical temperature at which a consumable power output from the battery unit is not higher than a maximum consumable power of the battery unit.

10. The computer system of claim 1, wherein the second preset critical point corresponds to a critical current at which a consumable power output from the battery unit is not higher than a maximum consumable power of the battery unit.

11. A computer system, comprising:
  a device which operates according to a clock frequency;
  a battery unit to supply power to the device; and
  a controller to control the clock frequency,
  wherein the controller scales a voltage level corresponding to the temperature of the battery unit as a dimension of a reference voltage level,
  wherein the controller comprises:
    a first comparator to compare a voltage level corresponding to a temperature of the battery unit with a voltage level corresponding to a first preset critical point;
    a second comparator to compare a voltage level corresponding to a current output with a voltage level corresponding to a second preset critical point; and
    a logical sum operator which comprises a first input terminal connected to an output terminal of the first comparator and a second input terminal connected to an output terminal of the second comparator, and outputs a clock control signal to the device.

12. The computer system of claim 11, wherein the device comprises a thermal throttling circuit to adjust the clock frequency according to the temperature, and the controller enables the thermal throttling circuit.

13. A battery module used in a computer system having a system part that operates according to a clock frequency, the battery module comprising:
  a battery unit, which comprises a plurality of battery cells, to supply power to the system part; a temperature sensor to sense a temperature of the battery cells;
  a current sensor to sense current output from the battery unit; a scaling factor unit which scales at least one of a voltage level corresponding to the sensed temperature and a voltage level corresponding to the sensed current as a dimension of a reference voltage level;
  a first comparator to compare a first voltage level corresponding to the sensed temperature with the reference voltage level;
  a second comparator to compare a second voltage level corresponding to the sensed current with the reference voltage level; and
  a logical sum operator to compare a first input terminal connected to an output terminal of the first comparator and a second input terminal connected to an output terminal of the second comparator, and to output a clock control signal to the system part.

14. A power control method of a computer system that comprises a battery unit and a device operating according to a clock frequency, the power control method comprising:
  simultaneously sensing temperature of the battery unit and a current output from the battery;
  scaling a voltage level corresponding to the sensed temperature as a dimension of a reference voltage level;
  comparing the voltage level corresponding to the sensed temperature of the battery unit with a voltage level corresponding to a first preset critical point to yield a first result;
  comparing a voltage level corresponding to the current output with a voltage level corresponding to a second preset critical point to yield a second result;
  summing, by a logical summing operator, the first result and the second result, and
  outputting a clock control signal by the logical summing operator to the device in response to the summing.

15. The power control method of claim 14, wherein the device comprises a thermal throttling circuit to control the clock frequency according to temperature, and the decreasing the clock frequency comprises: enabling the thermal throttling circuit, and dividing the clock frequency.

16. The power control method of claim 14, wherein the clock frequency is decreased if the scaled voltage level is greater than the reference voltage level.

17. The power control method of claim 14, further comprising: scaling a voltage level corresponding to the sensed current as a dimension of a reference voltage level.

18. The power control method of claim 17, wherein the clock frequency is decreased if the scaled voltage level is greater than the reference voltage level.

* * * * *